Dec. 20, 1966     H. L. BIEN     3,292,461

METHOD OF MAKING CUTTING DIES

Filed May 11, 1964

INVENTOR
HOWARD L. BIEN
BY *[signature]*
ATTORNEY.

United States Patent Office 3,292,461
Patented Dec. 20, 1966

3,292,461
METHOD OF MAKING CUTTING DIES
Howard L. Bien, Forest Hills, N.Y., assignor to Production Technologies, Inc., Plainview, N.Y., a corporation of New York
Filed May 11, 1964, Ser. No. 366,491
6 Claims. (Cl. 76—107)

The present invention relates to a method of making cutting dies to be used in working on sheet material and is preferably designed, though not necessarily, for the production of a limited number of punchings of an irregular outline.

A method of making a device for punching sheet metal has been proposed before which comprises the steps of cutting an opening in a die block having the contour of the desired punching and then bending blade means in strip form to make cutting edges and fitting them around the inside of the opening of the die block. A smaller block of the same contour is pressed thereafter into the space enclosed by the blades, a punch plate is fastened to a base plate and the cutting edges of the blades are pressed into the punch plate to mark off the desired contour thereon. The marked punch plate is then removed from the base plate and trimmed to the marked outline of the contour and finally the trimmed punch plate is fastened to the base plate. This method brought insufficient results only, because it provided for the thickness of the sheet metal by trial and error only.

Another method of making cutting dies has been disclosed in applicant's own prior Patent No. 2,791,134, dated May 7, 1957, which comprises the steps of cutting out of a block a center piece having an inner and outer contour, respectively, of the article to be punched out of sheet material, whereupon blade means are fitted around the center piece and the latter is reassembled in the block with the blade means projecting from the block and clamped therebetween. A layer of spacing material of a thickness complementary to the thickness of the sheet material to be worked is then applied on the inside of the projecting portion of the blade means. Material, as for instance plastic material, is then poured in its liquid state into the space defined by the top face of the center piece and the layers of spacing material to form a punch member of a contour complementary to the center piece, the difference in size between the punch member and the center piece being determined by the thickness of the sheet material to be punched. Finally, the punch member and the clamped blade means are mounted on oppositely disposed supporting members to operate as male and female die members, respectively.

It is one object of the present invention to provide a method of making cutting dies, which constitutes a further development of the method disclosed in said Patent No. 2,791,134 and which permits an appreciably greater number of punchings and is subjected to less wear during the operation of the cutting die, as well as broadens the applications of the dies.

It is another object of the present invention to provide a method of making dies which comprises the steps of cutting out of a block a centerpiece having an inner and outer contour, respectively, of an article to be punched out of sheet material, bars, flat steel, or the like, whereupon first tool steel sections are fitted around the centerpiece and the latter is reassembled in the block with the first tool steel sections projecting from the block and retained therebetween. A layer of spacing material of a thickness complementary to the thickness of the sheet material to be worked is then applied on the inside of the projecting portion of the first steel tool sections. Material, as for instance plastic material, is then poured in its liquid state into the space defined by the top face of the center piece and the layers of spacing material to form a center member of said poured material, which may solidify at room temperature, or at a lower or higher temperature, depending upon the desired speed of curing. Prior to the solidification of the center member a second set of tool steel sections is inserted inside of the first set of tool steel sections adjacent the spacing layer. The second set of tool steel sections projects preferably, but not necessarily, beyond the first set of tool steel sections. Upon solidification of the center member, the latter is removed jointly with the second set of tool steel sections to constitute a male punch member having a tool steel periphery, while the remaining unit jointly with the first set of tool steel sections constitutes the female die member to be mounted for punching opposite the male punch member.

With these and other objects in view, which will become apparent in the following detailed description, the present invention will be clearly understood in connection with the accompanying drawing, in which.

Figure 1:
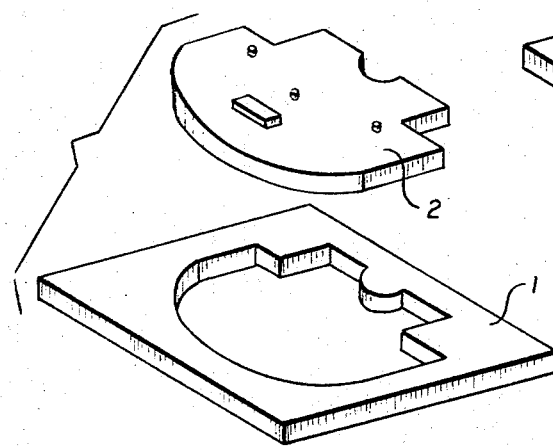
FIGURE 1 is a perspective exploded view of a wood block and its complementary center piece.
Figure 2:
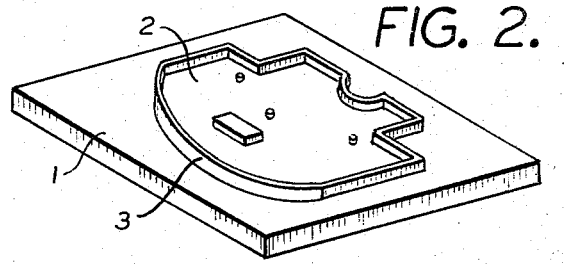
FIG. 2 is a perspective view of the wood block, the center piece being reinserted, together with tool steel sections.
Figure 3:
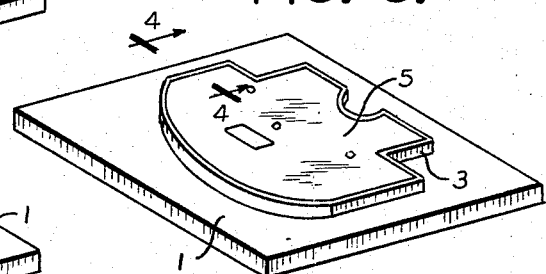
FIG. 3 is a top perspective view of the wood block with its centerpiece and the tool steel sections therebetween, and a punch molded therein.
Figure 5:
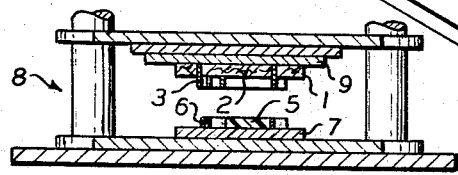
FIG. 5 is a top perspective view of the molded punch after insertion of a second set of tool steel sections.
Figure 4:
FIG. 4 is a section along the lines 4—4 of FIG. 3.

Referring now to the drawing, the present method provides the production of a male punch member and a female die member, wherein both members are equipped with tool steel sections, which permit for practical purposes an unlimited number of stampings under appreciably greater economic conditions compared with conventional dies.

The method according to the present invention provides at first a wood block 1 on which the outline of the shape to be punched out of the sheet material, bars, flat stock, or the like is marked. A centerpiece 2 is then cut out from the wood block 1 along marked lines and removed from the wood block 1. Tool steel sections 3 are fitted to the side faces of the centerpiece 2, whereupon the centerpiece 2 is inserted again into the wood block 1 together with the tool steel sections 3. In order to bring about a good fit of the tool steel sections 3 between the centerpiece 2 and the wood block 1 it is preferable to use a saw blade (not shown) for cutting out the centerpiece 2, which saw blade has a thickness equivalent to that of the blade means 3, or the saw blade may have lesser thickness, in which case by example a press fit or any other suitable means can be used.

Upon reassembling the centerpiece 2 with the tool steel sections 3 into the wood block 1, the tool steel sections 3 project above the top face of the wood block 1 and the centerpiece 2, respectively, and a male punch member is now produced. This is brought about by pouring a suitable material which may be an alloy, a plastic or any other suitable material having characteristics, which makes it suitable for the present purpose, on top of the centerpiece 2, whereby the tool steel sections 3 constitute the lateral limitations during the pouring of the material. The internal shapes thus formed in the mold may be used as drill jigs for securing these shapes to a steel plate, as set forth below.

Figure 6:
FIG. 6 is a section along the lines 6—6 of FIG. 5.
Figure 10:
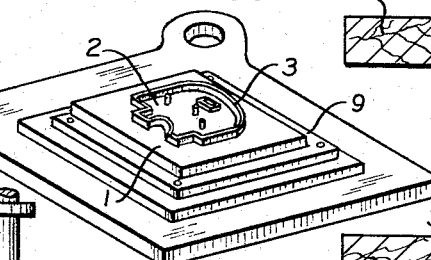
FIG. 10 is a bottom perspective view of the female die member mounted on a press.
Figure 7:
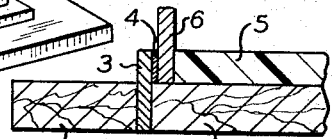
FIG. 7 is a section, similar to that of FIG. 6, the second set of tool steel sections projecting further beyond the first set of tool steel sections.
Figure 11:
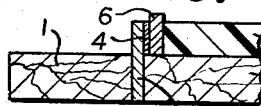
FIG. 11 is a section along the lines 11—11 of FIG. 9 indicating the alignment and cooperation of the male punch member with the female die member.
Figure 8:
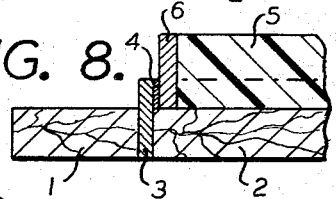
FIG. 8 is a section, similar to that of FIG. 7, after pouring additional material on top of the center member.
Figure 9:
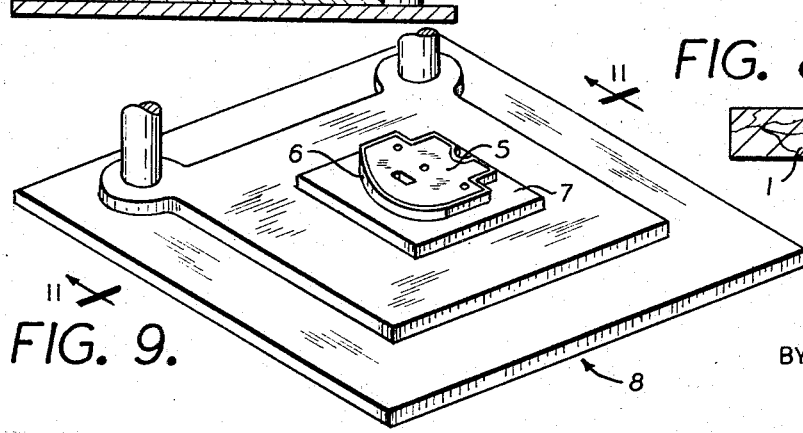
FIG. 9 is a top perspective view of the male punch member mounted on a press.

A spacing layer 4 is provided on the inner face of the tool steel sections 3 prior to the pouring of the material, thereby forming the poured mold 5. Before the mold 5 solidifies (for example, prior to pouring the material or after pouring the material, but before solidification), a second set 6 of tool steel sections is inserted into the mold 5 adjacent the spacing layer 4. The second set 6 of tool steel sections are formed prior to pouring the material by placing the layer of spacing material 4 on the inside of the tool steel sections 3, and then bending and forming the tool steel sections 6 to conform to the same shape as sections 3, but smaller by the amount of layer 4. As indicated in FIGS. 6, 7 and 8, the second set 6 of tool steel sections projects to different levels beyond the first set 3 of tool steel sections. As further indicated, the level of the material can be raised, if the punch member to be formed requires a greater thickness.

Upon solidification of the mold 5, the latter can be removed jointly with the second set 6 of the tool steel sections to constitute the male punch, while the centerpiece 2 together with the first set 3 of the tool steel sections constitutes the corresponding female die.

The male punch can be mounted on a plate 7 of a press 8 or any equivalent device, and the female die is mounted on a plate 9 in an arrangement opposite the male punch.

While I have disclosed one embodiment of the present invention, it is to be understood that this embodiment is given by example only and not in a limiting sense, the scope of the present invention being determined by the objects and the claims.

I claim:

1. A method of making cutting dies comprising the steps of cutting out of a block a centerpiece having the contour of an article to be punched out of sheet material, fitting first tool steel sections around said centerpiece and reassembling said centerpiece in said block with said tool steel sections projecting from said block and clamped therebetween to form a female die member, pouring material in its liquid state into the space defined by the top face of said centerpiece to form a punch member of a contour complementary to said centerpiece, fitting second tool steel sections into said poured punch member prior to its solidification adjacent said first tool steel sections, and removing said punch member jointly with said second tool steel sections from said female die member.

2. The method of claim 1 including the additional step of applying a layer of spacing material of a thickness complementary to a desired clearance related to the thickness of the material to be worked on the inside of the projecting portion of said first tool steel sections prior to pouring material into the space defined by the top face of said centerpiece, to form a punch member of a contour complementary to said centerpiece, the difference in size between said punch member and said centerpiece being determined by the thickness of the sheet material to be punched, and fitting the second tool sections prior to the solidification of the pouring material in its liquid state adjacent said layer of spacing material.

3. The method, as set forth in claim 1, which includes the step of pouring additional material on top of the first mold after inserting the second set tool steel sections therein.

4. The method, as set forth in claim 2, which includes the step of pouring additional material on top of the first mold after inserting the second set tool steel sections therein.

5. The method of claim 1 including the additional step of mounting said punch member and said female die member in opposite arrangement for punching.

6. The method of claim 3 including the additional step of mounting said punch member and said female die member in opposite arrangement for punching.

References Cited by the Examiner

UNITED STATES PATENTS

| 2,821,871 | 2/1958 | Sarno | 76—107 |
| 2,885,913 | 5/1959 | Lescallette | 76—107 |
| 3,052,139 | 9/1962 | Trimble | 76—107 |

FOREIGN PATENTS 767,438  2/1955  Great Britain.

GRANVILLE Y. CUSTER, JR., *Primary Examiner.*